United States Patent [19]
McMahon et al.

[11] 4,201,442
[45] May 6, 1980

[54] LIQUID CRYSTAL SWITCHING COUPLER MATRIX

[75] Inventors: Donald H. McMahon, Carlisle; Richard A. Soref, Newton Centre, both of Mass.

[73] Assignee: Sperry Corporation, New York, N.Y.

[21] Appl. No.: 947,983

[22] Filed: Oct. 2, 1978

[51] Int. Cl.² .................................................. G02B 5/14
[52] U.S. Cl. ................................ 350/96.14; 350/347 V
[58] Field of Search ............... 350/96.12, 96.14, 96.16, 350/334, 347, 96.32

[56] References Cited

U.S. PATENT DOCUMENTS

| | | | |
|---|---|---|---|
| 3,918,794 | 11/1975 | Milton | 350/96.16 |
| 3,980,395 | 9/1976 | Gialloreni et al. | 350/334 |
| 4,003,629 | 1/1977 | Baues et al. | 350/96.14 |
| 4,120,560 | 10/1978 | Baues et al. | 350/96.14 |

*Primary Examiner*—Stewart J. Levy
*Attorney, Agent, or Firm*—Howard P. Terry

[57] ABSTRACT

Directionally coupling internal channel wave guide electrooptical switches are provided that employ electric field-effect liquid crystal compositions and that lend themselves to use in large scale planar integrated switching arrays. Light propagation through the liquid crystal medium is restricted to the very small part of that medium actively associated with the electric switching field, thus minimizing light losses.

12 Claims, 8 Drawing Figures

LIQUID CRYSTAL SWITCHING COUPLER MATRIX

BACKGROUND OF THE INVENTION

1. Field of the Invention

The invention pertains to improved electrooptical switches and more particularly relates to novel directionally coupling channel wave guide electrooptical switches employing electric field-effect liquid crystal compositions and compatible for use in large scale, integrated multiple switch matrix arrays.

2. Description of the Prior Art

Optical switching devices employing electrooptical materials such as $LiNbO_3$ or $LiTaO_3$ are well known in the art. While some degree of success has been achieved in devising such electric field switched devices in matrix forms, the use of these solid crystalline materials imposes certain serious limitations on the situation.

Generally, the size of available $LiNbO_3$ or $LiTaO_3$ crystals is limited to about one by three inches, and there is no apparent opportunity seen for overcoming this size limitation without extreme expense. No other solid electrooptic materials are known to have large electrooptic coefficients and otherwise suitable optical properties. With array substrate sizes so limited, the number of switches that may be employed in the matrix switches constructed of such materials is evidently severely limited.

SUMMARY OF THE INVENTION

The invention comprises novel directionally coupling channel wave guide electrooptical switch elements suitable for use in large scale, integrated multiple switch planar matrix arrays. A liquid crystal film is used as the active electrooptical switching medium, a medium in which modest electric fields induce large changes in index of refraction. In each unitary switch, an internal channel optical wave guide is disposed beneath and at the surface of a first solid substrate. Similarly, an internal channel optical wave guide core is disposed beneath and at the surface of a second solid substrate. The substrates are disposed with the channel guide core surfaces facing each other for confining the liquid crystal layer. Before assembly, an electrode is placed over each channel at the generally central point where the channel guides cross at a small angle. Many such switching regions may be incorporated in a planar integrated circuit matrix with a first set of parallel channel wave guides crossing over a second set of parallel channel wave guides, the two parallel arrays forming small angles with respect to each other.

It is to be observed that the elemental liquid crystal switch according to the present invention has additional beneficial properties, including the wide transmission band width of the order of tens to hundreds of megahertz required for maximum rate of transfer of optical data through the switching device. A useful switching element in a matrix must also demonstrate a switching speed of about one millisecond, a speed readily achieved in thin liquid crystal layers. While there is a significant light scattering loss concomitant with the large, easily switched anisotrophy of liquid crystal compositions for single mode signal transmission, it is preferred for many reasons to employ multi-mode optical transmission elsewhere in the optical system. The undesired scattering losses in the switch will be significantly less for multi-mode signals occupying a relatively large numerical aperture than for single mode transmission.

Even with the preferred multi-mode transmission, it is desired to restrict losses in each elemental switch to as low a level as possible; this is accomplished beneficially in the present invention by restricting light propagation substantially only to the low loss channel wave guides. Light that propagates through the liquid crystal medium is restricted to the very small part of that medium actively associated with the electric switching field, so that losses are again minimized. Furthermore, the channel wave guides that furnish cooperating paths when the light is switched are disposed at very small angles with respect to each other so that optical coupling is maximized.

The invention is particularly adaptable for use in multi-mode optical signal systems and thus benefits because of the desirable characteristics of such systems. Experience in guided optical data communication methods, while earlier intensely concerned with the fiber optic bundle and single mode integrated optical techniques, now leads to the conviction that an intermediate approach, the multi-mode, single optical fiber technology, can be most successfully applied to a wide variety of communication problems, especially where moderate band width and moderate distances are involved. Fabrication of passive interconnectors is simplified and the packing fraction losses characteristic of the fiber bundle method are eliminated. The single mode technology has been significantly advanced; however, important unsolved coupling problems still remain.

Simple light sources exist easily capable of coupling considerable power into available multiple mode, single fiber guides, and quite adequate photodetector devices for detecting the flow of light through such single fiber guides are also available. Evidently, the scheme for multiple mode, single fiber communication would be made useful if concepts existed for electrically controlling the routing of optical signals, so that data bussing, multiplexing, demultiplexing, and switching functions could be performed totally in the optical domain by reliable and inexpensive data terminals.

DESCRIPTION OF THE PREFERRED EMBODIMENTS OF THE INVENTION

Figure 1:
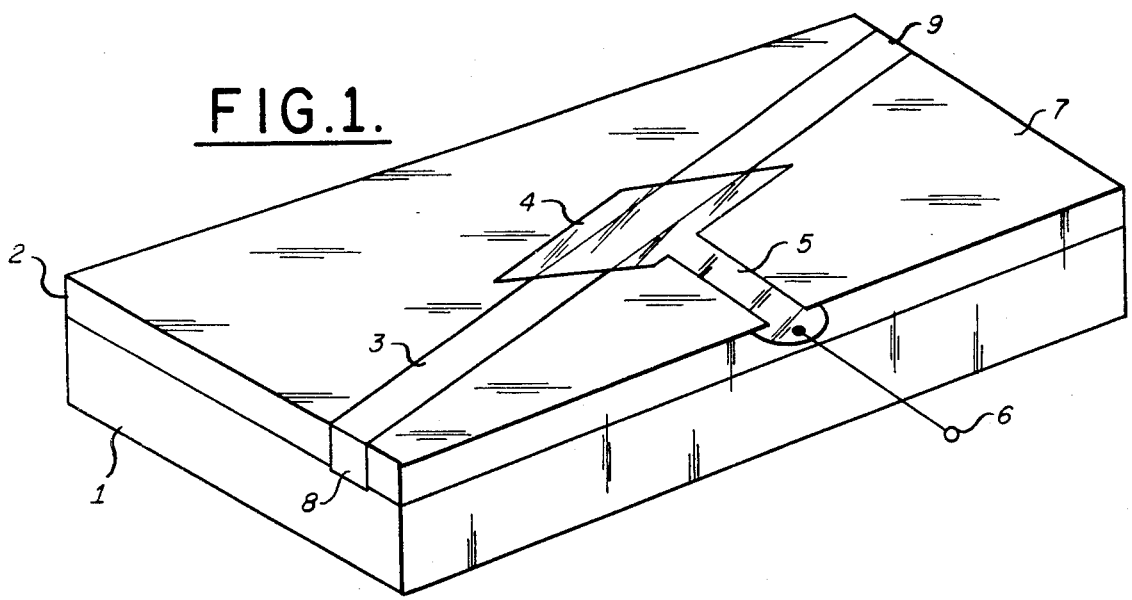
FIGS. 1 and 2 provide perspective views of first and second portions of the novel electrooptical liquid crystal switch.
Figure 2:
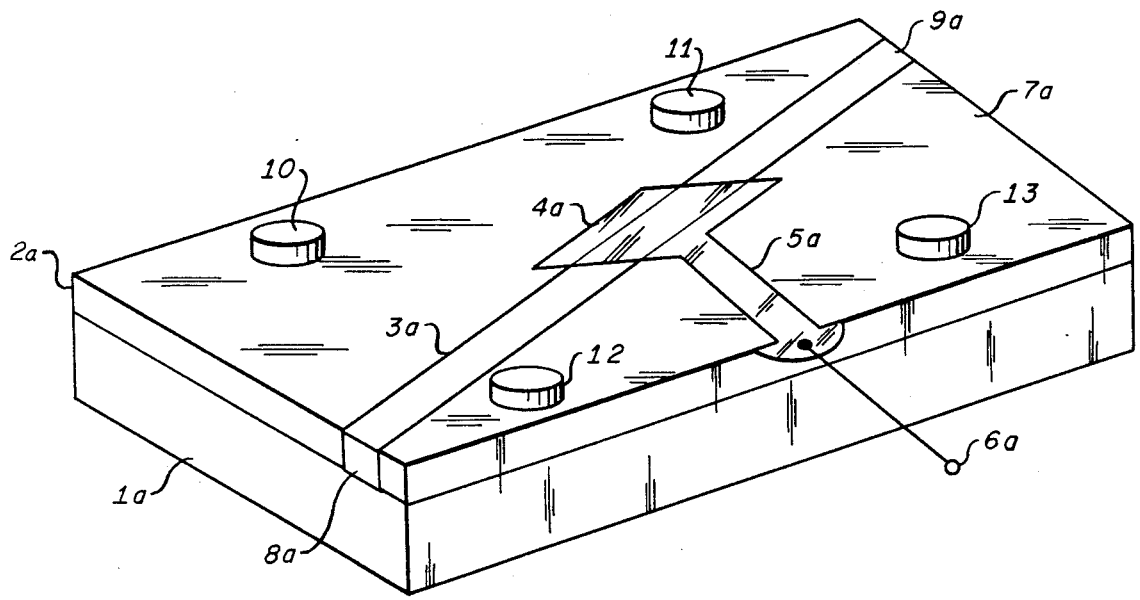
Figure 3:
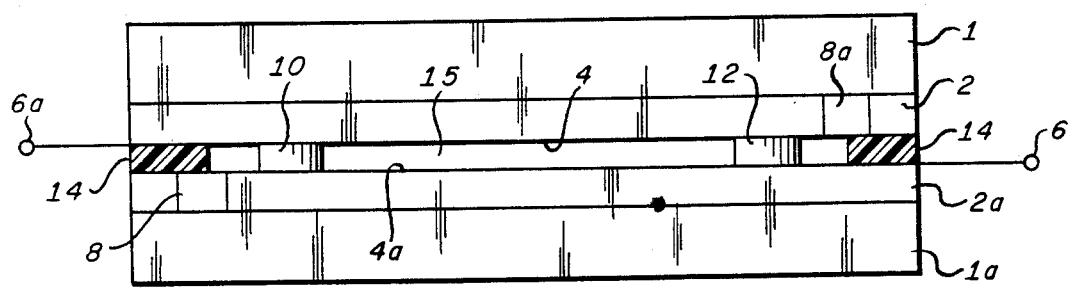
FIG. 3 is an end view, partly in cross section, of the assembled switch of FIGS. 1 and 2.

FIGS. 1 through 5 illustrate one preferred form of the invention in which a first method of construction is utilized. The structure, when completed, is formed of components particularly seen in FIGS. 1 and 2 as a layered configuration including an insulating substrate 1, a contiguous layer 2 of a material in which an internal channel optical wave guide 3 is formed, a field effect liquid crystal layer 15 associated with the active switching region identified by that reference numeral in FIG. 3, a second layer 2a of a material in which a second internal channel optical wave guide 3a is formed, and a final principal insulating layer 1a similar to substrate layer 1. In FIG. 1, layers 1 and 2 may be considered cooperatively to form a first dielectric plate, while layers 1a and 2a in FIG. 2 may be considered to form a second dielectric plate. Internal channel wave guides 3 and 3a are formed by means yet to be described within the respective layers 2, 2a before assembly of the structure and optically transparent conducting electrodes 4, 4a are also then formed centrally over the respective internal channel guides 3, 3a by a conventional process. Each electrode 4, 4a is supplied as it is put in place with a respective transparent conductor 5, 5a for coupling voltages from terminals 6, 6a for generating an electric field across the thin liquid crystal material layer. The electrodes 4, 4a may be diamond shaped, as shown, or oval or may take other forms. Spacers 10, 11, 12, 13 assure that the volume holding the liquid crystal composition at 15 has substantially uniform thickness in the general manner disclosed in the R. A. Soref U.S. Pat. No. 3,834,794, filed June 28, 1973 for a "Liquid Crystal Electric Field Sensing Measurement and Display Device". The spacers may be affixed to at least one or both layers 7, 7a or may extend through one of those layers, being formed as an integral part of substrate 1a, for example. To complete the enclosure for the liquid crystal material, a thin rectangular gasket or wall 14, for example, of a commercially available solid polymerized fluorocarbon resin, is used to join, in hermetically sealed relation, the peripheries of layers 7, 7a. It may be employed in the general manner described in the R. A. Soref, M. J. Rafuse U.S. Pat. No. 3,756,694, filed Sept. 9, 1971 for "Electric Field Controllable Birefringence Liquid Crystal Media and Optical Display Devices for Use Thereof".

In construction, the component of FIG. 1 is placed on top of separators 10, 11, 12, 13 after having been rotated 180° about its long axis, the liquid crystal composition is injected into volume 15 and the seal or gasket 14 is put in place at the periphery of the structure so as to hold it together and to encapsulate the liquid crystal composition. When put together in this or an equivalent manner, a phantom view from above will be similar to that of FIG. 5, where it is seen that the two internally formed wave guides 3, 3a cross each other in the central or switching region of the assembly at an angle A. Generally, angle A will be quite small, having been exaggerated in FIG. 5 as a matter of convenience in providing clarity. The angle A will typically have a value in the range between two and six angular degrees, the larger angles being used when the wave guide 3, 3a is capable of trapping a relatively wide angular range of light rays. Usually A is about 0.25 $\theta_c$, where the wave guide confinement angle $\theta_c = (2\Delta n/n)^{\frac{1}{2}}$, $\Delta n$ being the difference between the refractive indices of the wave guide's core and its surrounding.

Figure 4:
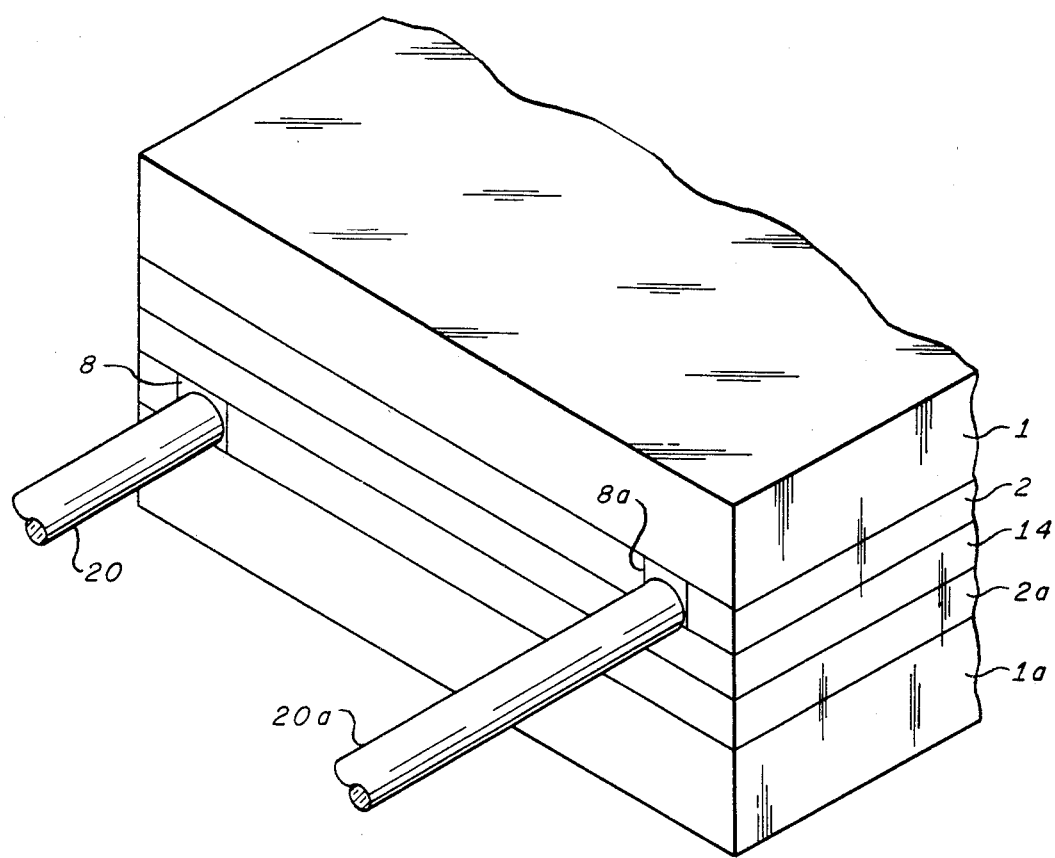
FIG. 4 is a perspective fragmentary view of one end of the apparatus of FIG. 3.
Figure 5:
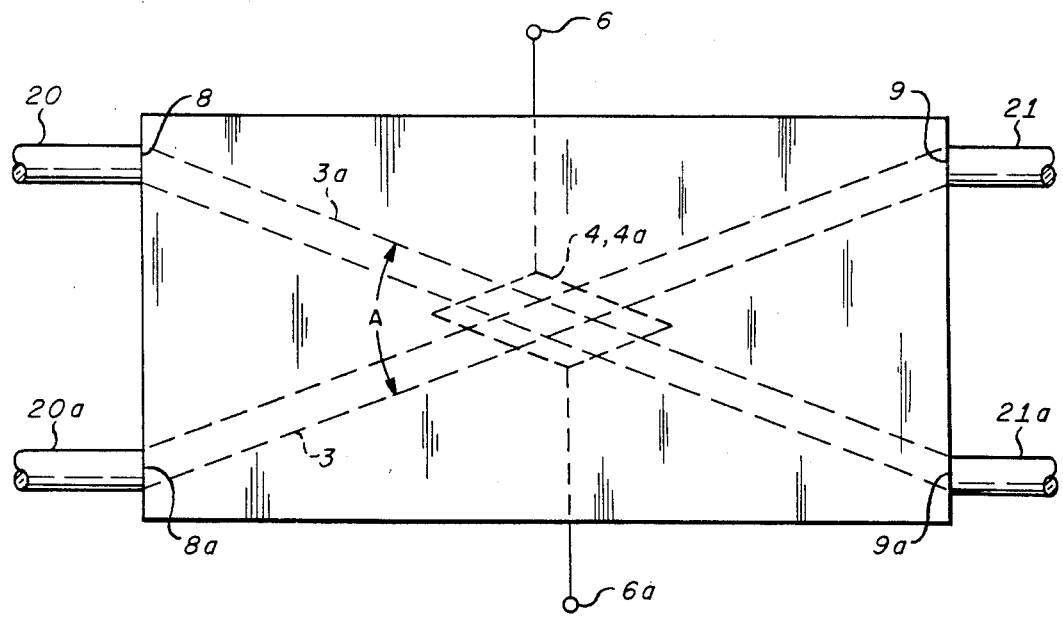
FIG. 5 is a top view of the apparatus of FIG. 3.

The two electrically conducting, transparent electrodes 4, 4a are seen disposed one above the other in the optical switching region, and their associated electrical conductors 6, 6a conveniently emerge at opposite sides of the structure. As seen in FIGS. 4 and 5, input and output optical fiber wave guides 20, 20a, 21, 21a may be affixed at the several respective ends 8, 8a, 9, 9a of the internal channel optical wave guides 3, 3a. The several fiber wave guides may be butt sealed to the ends of the internal guides 3, 3a, or may be cut at a small angle such that each fiber wave guide axis coincides with the axis of the associated internal channel wave guide.

In one embodiment of the invention in which stable internal channel wave guides 3, 3a are formed within respective photopolymer layers 7, 7a, the substrates 1, 1a are made of a relatively low optical index n of refraction material such as fused silica where n is about 1.47. Generally, materials werein n<1.55 are useful. Photopolymer layers 2, 2a, are affixed as they are generated to one low-loss smooth surface of each of the substrates by a selected conventional method, layers 2, 2a being generated as the situs of internal dielectric channel wave guides 3, 3a. For example, layers 2, 2a and the internal channel guides 3, 3a may be formed according to the method reported by E. A. Chandross et al in Applied Physics Letters, 24, No. 2, page 72, Jan. 15, 1974 or by the method of T. Kurokawa et al reported in Applied Optics, 16, No. 4, page 1033, April 1977. The photopolymer layers may be formed by immersing the cleaned substrate surface in a solution made of a matrix polymer such as polymethylmethacrylate, dopant monomers such as benzilmethacrylate and methylmethacrylate, a cross-linking agent such as ethyleneglycoldimethacrylate, a photosensitizer such as benzoinethylether, an inhibitor such as hydroquinone, and dichloromethane as a solvent. The dopants in the film formed on the substrate are polymerized by light from a range high pressure mercury lamp in the 320 to 370 nanometer through a suitable mask material such as photoresist. The film, after exposre, is immersed in a water-methanol mixture for about an hour to remove the unreacted dopants. The internal wave guiding channels 3, 3a are formed where the dopants are light-struck, the event causing formation from the dopants of bonded insoluable molecules increasing the index of refraction of the material of the film and forming internal channel wave guides 3, 3a. Various choices of constituent materials are available for enabling selection of the index of refraction value of the internal dielectric channel wave guides with respect to the films 2, 2a, including those described by T. Kurokawa et al in Applied Optics, 17, No. 4, page 646, Feb. 15, 1978. Such procedures produce internal channel optical wave guides having refractive indices about one percent greater than the surrounding film and having a diameter, for instance, of about 0.1 millimeters.

Materials of the substrates 1, 1a, the light-struck optical channel wave guides 3, 3a and the liquid crystal layer 15 are readily selected so that, in the absence of an electric field between transparent electrodes 4, 4a, the internal channel wave guides 3, 3a have the highest index of refraction, the glass substrates 1, 1a, have the lowest index of refraction, and the liquid crystal layer 15 has an index intermediate the other two layers. When the normal operating electric field is present across layer 15, the index of refraction of the liquid crystal layer is raised to a new value slightly higher than that of the photopolymer channel wave guides 3, 3a. As previously noted, there is no problem in obtaining photopolymer materials yielding internal channel wave guides having an index of refraction greater than fused silica.

The literature describes many liquid crystal compositions having low indices of refraction that are suitable for use with internal wave guiding channels made of conventional photopolymers, especially if temperature is held reasonably constant in the usual manner. Compositions free of voltage-induced turbulence and consequent dynamic scattering are desired, compositions demonstrating only electric-field-induced re-alignment. Acceptable liquid crystal composition should respond well at low electric fields, having a high birefringence, have a wide temperature range, and have a predictable molecular alignment in the field-on and field-off states.

For example, one suitable liquid crystal composition is sold under the code number 684 by the E. M. Laboratories, Elmsford, New York 10532, and has indices $n_o = 1.52$ and $n_e = 1.73$. A second E. M. Laboratories mixture with code number 10 has indices $n_o = 1.56$ and $n_e = 1.77$. A material supplied by the BDH Chemicals Company, Dorset, England, as their mixture E7 has $n_o = 1.52$ and $n_e = 1.72$. The indices $n_e$ and $n_o$ have an important relation to the index $n_{core}$ of the wave guide cores 3, 3a. The value $n_{core} > n_o$ by about 0.05 to 0.10 in order that the effective cladding of the liquid crystal will confine the light totally within the core in the electric-field-zero state. Also, to allow the light to radiate totally out of one guide into the liquid crystal medium, to traverse the liquid crystal medium, and to enter the second guide, $n_{core} \leq n_v$, where $n_v$ is the effective liquid crystal index of refraction in the presence of the electric field. Here, $n_v$ is about equal to $n_e$. In addition, the optimum field-on condition is $n_{core} = n_e$.

A preferred liquid crystal material is the biphenyl material called 4-cyano-4'-n-hexylbiphenyl obtained from the BDH Chemical Company. In this composition, $n_o$ is about 1.54 to 1.55 and $n_e$ is about 1.63 to 1.71, depending upon the optical wave length. The thickness of the liquid crystal layer 15 should be small to minimize the amount of light radiated out of both internal wave guide channels 3, 3a in the vicinity of the active switching region, and also to minimize the voltage level required for switching as well as reducing switching time. Since the photopolymer channel wave guides 3, 3a will, for example, be about 50 to 75 micrometers in diameter so as to match typical multimode fibers, the thickness of the liquid crystal layer 15 will generally be about 15 to 25 micrometers.

In the absence of an electric field across the liquid crystal layer 15, light flowing into any one of the internal wave guide channels 3 or 3a will be internally reflected by the upper and lower interfaces of the photopolymer layers 2, 2a and the liquid crystal layer 15. It will also be bound within each internal channel by its vertical interfaces with the remainder of layers 2, 2a. Thus, light entering via optical fiber 20 will normally appear as an output in optical fiber 21a. If the index of refraction of the liquid crystal layer 15 is now altered by placing a switching voltage on terminals 6, 6a, so that the index is slightly higher than the index of refraction of the internal channel wave guides, light will no longer be reflected by the photopolymer-liquid crystal interface. In this condition, a substantial fraction of the initially guided light can propagate through the liquid crystal layer 15 from photopolymer channel 3 to photopolymer channel 3a, or vice versa. In the presence of the electric field, the active region in the liquid crystal layer 15 between electrodes 4, 4a serves as an optical power divider. Light incident in FIG. 5 via fiber optic guide 20a into the channel wave guide 3 of photopolymer layer 2 will, for example, be split within the excited liquid crystal layer 15 between the right handed portions of channel wave guides 3 and 3a to exit via fiber optic guides 21, 21a. In a similar manner, light indicent via fiber optic guide 20 into the channel wave guide 3a of photopolymer layer 2a will be split within the excited liquid crystal layer 15 between the right handed portions of channel wave guides 3a and 3 to exit via the respective fiber optic guides 21a, 21.

The exact degree of division of light between output fibers 21, 21a will depend upon conventional factors. For example, there are several molecular orientations of the liquid crystal composition that may be used. In the zero voltage state for an optimum configuration, the long nematic liquid crystal molecules are uniformly aligned with their molecular axes directed along the propagation direction of the channel wave guide in the plane of the liquid crystal layer 15. In the voltage excited state, with a voltage across the liquid crystal layer of about 50 volts r.m.s., for example, the liquid crystal along axes become uniformly perpendicular to the plane of liquid crystal layer 15. In the zero voltage state, both the TE and TM modes are trapped in the input channel wave guide. On the other hand, in the second or finite voltage state, the TM mode light will transfer from the input channel 3, say, into the output channel guide 3a, providing the desired switching event. The TE mode light is normally not disturbed. Thus, the device of FIG. 5 acts as a switching optical directional coupler; aside from the small amount of light scattered in the active junction region between electrodes 4, 4a, no light entering fiber optic guide 20 may reach input fiber optic guide 20a; for example.

Internal wave guide channels may be formed directly in suitable dieletric plates without dependence upon the presence of photopolymer layers such as layers 2, 2a. For example, ion-exchange or thermal migration processes in glass or other substrates may be employed toform doped-glass internal wave guide channels by the method described, for example, by T. G. Giallorenzi et al, Applied Optics, 12, No. 6, page 1240, June 1973. While such doped-glass channel wave guides offer better ruggedness and the same mass-production versatility as photopolymer wave guides, including the realization of the customized large scale integrated format obtained by photolithographic masking, the internal channel wave guides themselves are not characterized by a fully uniform index of refraction.

Figure 6:
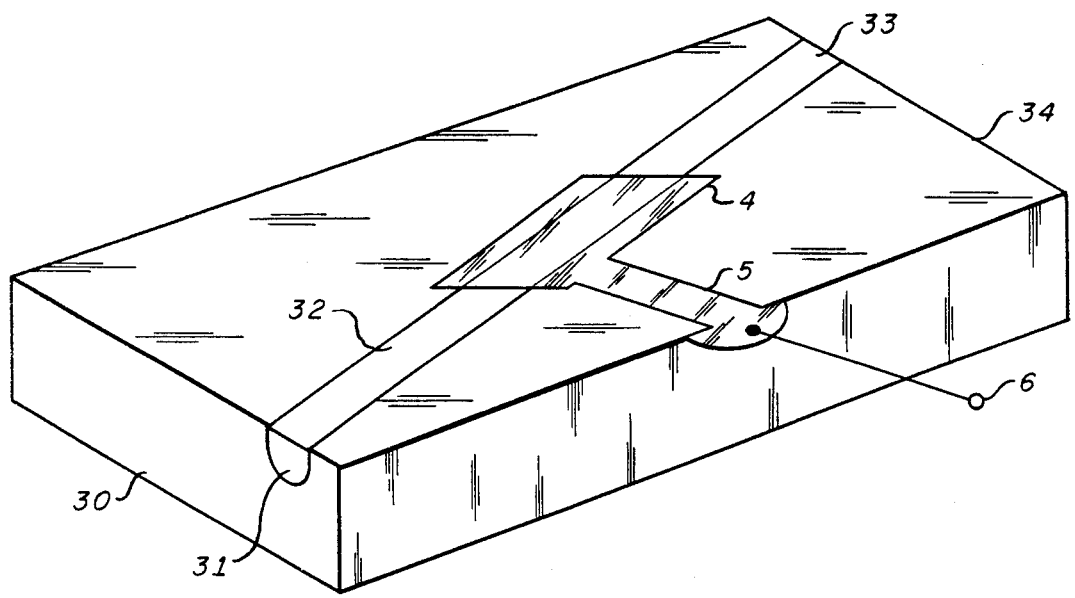
FIG. 6 is a perspective view of an alternative form of the apparatus of FIG. 1.
Figure 7:
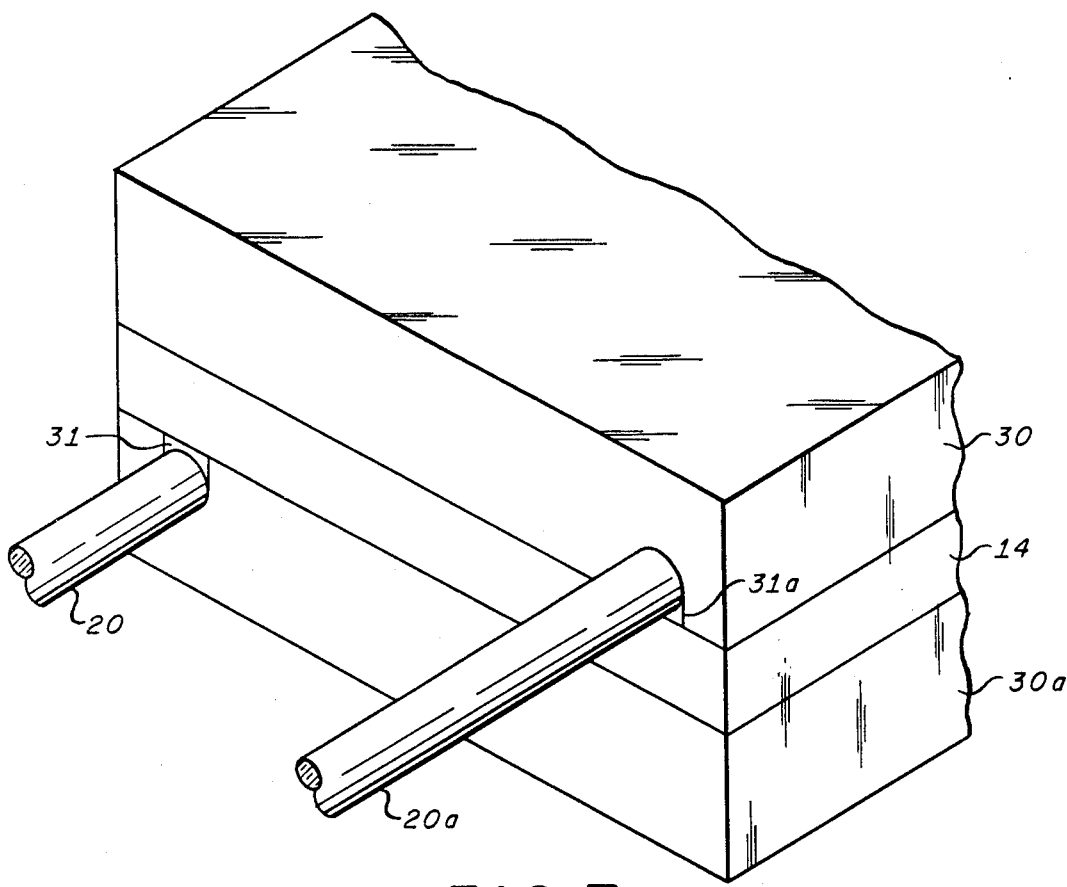
FIG. 7 is a perspective fragmentary view related to the apparatus of FIG. 6.

In FIG. 6, such a doped-glass internal wave guide channel 32 is shown disposed directly within a suitable first dielectric plate 30 and extending between its respective input and output faces 31, 33. A transparent electrode 4 and connector 5 on surface 34 are again associated with a terminal 6. It will be recognized by those skilled in the art that the element of FIG. 6 is analogous to that of FIG. 1 and that the element of FIG. 6 will be used with a similar dielectric plate element 30a (FIG. 7) analogous to that of FIG. 2 to form a complete sandwiched structure. Input (or output) fiber wave guides 20, 20a are again associated with end faces 31, 31a of the respective crossed internal channel wave guides (FIG. 7). The appearance of the completed sandwiched structure will again be similar to that of the phantom view of FIG. 5.

Referring again to FIG. 6, and by way of example, surfaces of a pair of dielectric plates 30, 30a of conventional soda-lime glass with an index of refraction of about 1.51, for example, are optically polished and cleaned. Following the method of Giallorenzi et al, diffusion of silver or other metal ions into the polished and masked surface with consequent lithium and sodium ion out-diffusion produces a large increase in the index of refraction of the glass for forming the channel wave guide. Measured index values for silver-doped channel wave guides in soda-lime glass plates for light at 0.63 nanometers are about 1.59. This is an appropriate index value for the channel wave guides of the present invention because it falls roughly midway between the $n_o$ and $n_e$ indices particularly of the aforementioned biphenyl liquid crystal composition of the BDH Chemical Company. Other useful indices may readily be achieved for cooperative use with other liquid crystal compositions. The metal ion exchange method of channel wave guide construction, further described by Stewart et al, I.E.E.E. Journal of Quantum Electronics, QE-13, No. 4, page 192, April 1977 involves, for example, the immersion of the soda-lime glass surface to be treated, properly masked, in molten silver nitrate at about 250° C. for 50 to 100 hours. Gold or aluminum masking is first applied to the surface to delineate each channel wave guide. The method described by Chartier, Electronics Letters, 14, page 132, Mar. 2, 1978 provides a convenient way of obtaining low-loss silver-doped channels with $n_{core}=1.60$.

In the embodiments of the invention so far discussed, the electrodes 4, 4a are thin relatively transparent layers of a conducting metal non-destructive of the liquid crystal composition and covering each intersection of an associated pair of channel wave guides. Chromium may be employed in thickness between 20 and 50 Angstroms, or the electrodes 4, 4a may be made in the conventional manner of transparent, electrically conducting tin oxide by evaporative deposition or sputtering.

Figure 8:
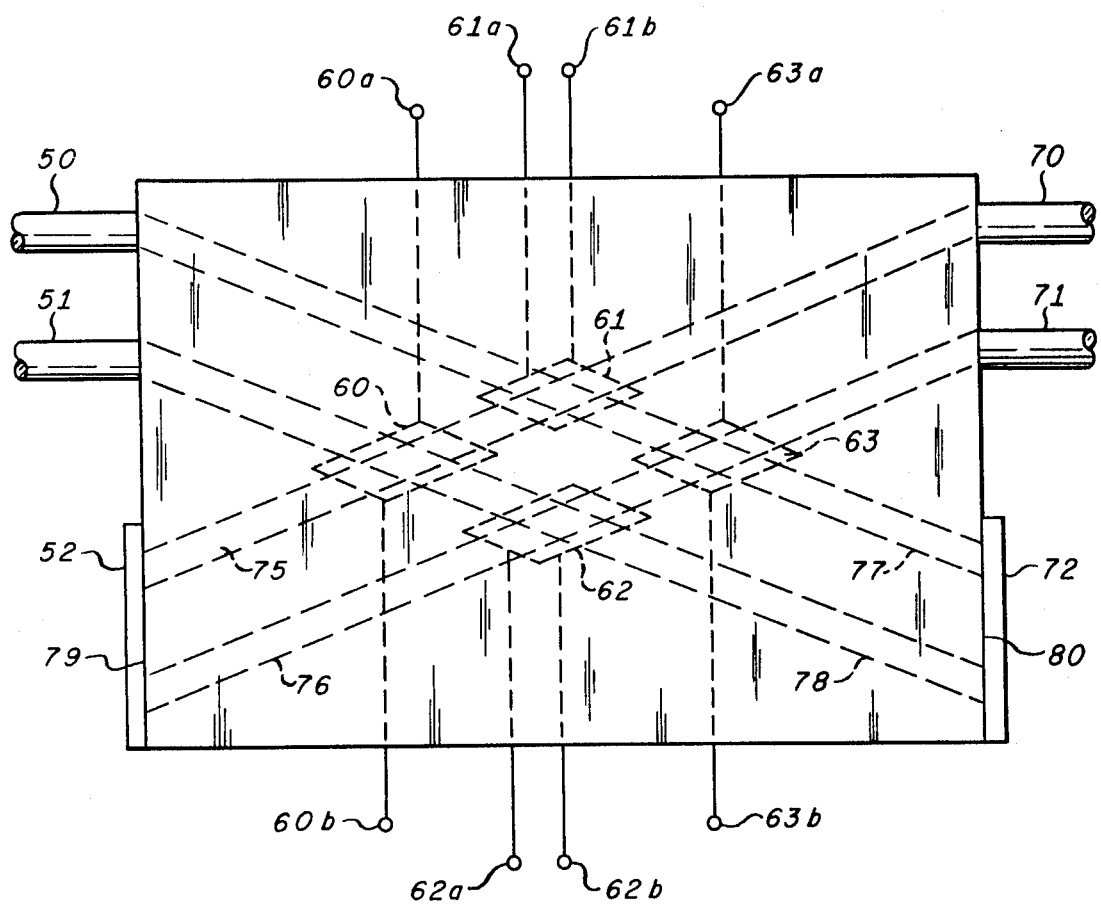
FIG. 8 is a top view of a large scale multiple switch version of the apparatus of FIG. 5.

Similar sets of electrodes 60, 61, 62, 63 may be used in the quadruple switch matrix of FIG. 8 under the respective control of electrode leads 60a, 60b; 61a, 61b; 62a, 62b; and 63 and 63b. In FIG. 8, as in the preceding figures, there are pairs of transparent electrodes at each of the four switching sites, one electrode of each pair on each side of the liquid crystal layer. Coincidence addressing is employed so that the electric field is present only if both electrodes are connected to the voltage source. Alternatively, sets of alternately charged parallel bar electrodes may be placed on one side of the liquid crystal layer. Channel wave guides 77, 78 are disposed in the lower photopolymer layer, while channel wave guides 75, 76 find themselves in the upper photopolymer layer.

In FIG. 8, light introduced by fiber optic wave guide 50 may be switched by switch 61 or 63 to the respective output fibers 70 or 71, while light injected by fiber optic wave guide 51 may similarly be diverted by switch 60 or 62 to one of the output fibers 70 or 71. Undiverted light in the input channel wave guides 77 or 78 is absorbed by an appropriate light absorber 72 affixed to an edge surface 80 of the structure. Any light scattered back into output channel wave guides 75 and 76 is similarly absorbed by an absorber 52 affixed to surface 79 opposite absorber 72. Since not all light is switched in this array, all light paths must include only one activated switching site. In other words, if there are N input and N output fibers in an extended version of the FIG. 8 switching matrix, a maximum of N simultaneous conversations are allowed. For maximum coupling between channel wave guides when the interposed switch is activated, it is preferred that the angle between the coupled channel wave guides be small.

Accordingly, it is seen that the invention is a directional switching coupler of the kind compatible for use in multi-mode optical data transmission and processing system. More particularly, the invention provides novel directionally coupling channel wave guide electrooptical switches employing electric field-effect liquid crystal compositions, rapid-acting switches particularly adapted to use in large scale, integrated multiple switch matrix or other optical arrays. The switch has many desirable properties, including structural simplicity and ease of fabrication, as well as beneficially providing substantially separate and optimum media for light propagation between switches and for the switching function itself.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Electrooptical switch means comprising:
   first dielectric plate means having first planar surface means,
   first internal channel optical wave guide means having first boundary means at said first planar surface means,
   second dielectric plate means having second planar surface means,
   second internal channel optical wave guide means having second boundary means at said second planar surface means,
   said first and second dielectric plate means being disposed with said first and second surface means in facing spaced parallel relation so that said first and second internal channel optical wave guide means cross one over the other for forming a cross-over region,
   liquid crystal fluid means disposed between said first and second surface means, and
   means for selectively applying an electric field in said liquid crystal fluid means substantially only at said crossover region, including first and second transparent electrode means respectively affixed in opposed facing relation to said first and second planar surface means and to said first and second boundary means,
   said first and second internal channel optical wave guide means being formed in situ by permanent induction of first and second regions of increased index of refraction at said first and second planar surface means.

2. Apparatus as described in claim 1 wherein:
   said first and second dielectric plate means comprise a glass material, and
   said first and second internal channel optical wave guide means comprise said glass material whose index of refraction is locally altered by injection of metal ions.

3. Apparatus as described in claim 2 wherein said liquid crystal fluid means comprises 4-cyano-4'-n-hexylbihenyl.

4. Apparatus as described in claim 2 wherein said glass material comprises a soda-lime glass.

5. Apparatus as described in claim 1 further including wall means for completing liquid crystal fluid enclosure means defined in part by said first and second dielectric plate means.

6. Apparatus as described in claim 1 wherein, in the absence of said electric field, the index of refraction of said liquid crystal fluid means is lower than the index of refraction of said first and second internal channel optical wave guide means.

7. Apparatus as described in claim 6 wherein, in the presence of said electric field, the index of refraction of said liquid crystal fluid means is greater than the index of refraction of said first and second internal channel optical wave guide means.

8. Apparatus as described in claim 7 wherein the index of refraction of said first and second dielectric plate means is lower than the index of refraction of said first and second internal channel optical wave guide means.

9. Apparatus as described in claim 1 wherein:
said first and second dielectric plate means each comprise contiguous substrate and photopolymer layers,
said photopolymer layers providing said first and second surface means spaced in facing parallel relation, and
said first and second internal channel optical wave guide means lying wholly within said photopolymer layers.

10. Apparatus as described in claim 1 wherein said first and second internal channel optical wave guide means in said photopolymer layers are formed in situ by photopolymerization of masked portions of said photopolymer layers.

11. Apparatus as described in claim 1 wherein said liquid crystal fluid means comprises a nematic material exhibiting substantially only electric-field-induced realignment of the molecular order thereof without turbulent flow.

12. Apparatus as described in claim 1 wherein the angle between said first and second internal channel optical wave guide means at said cross-over region lies between two and six degrees.

* * * * *